United States Patent
Teipen (10) Patent No.: US 8,401,383 B2
(45) Date of Patent: Mar. 19, 2013

(54) DATA TRANSMISSION METHOD AND NETWORK FOR TRANSMITTING A DIGITAL OPTICAL SIGNAL OVER OPTICAL TRANSMISSION LINKS AND NETWORKS

(75) Inventor: Brian Teipen, Kirchheim (DE)

(73) Assignee: ADVA Optical Networking SE, Meiningen (DE)

(*) Notice: Subject to any disclaimer, the term of this patent is extended or adjusted under 35 U.S.C. 154(b) by 267 days.

(21) Appl. No.: 12/778,974

(22) Filed: May 12, 2010

(65) Prior Publication Data

US 2010/0290780 A1  Nov. 18, 2010

(30) Foreign Application Priority Data

May 13, 2009  (EP) .................................. 09006461

(51) Int. Cl.
*H04B 10/08* (2006.01)
*H04J 14/02* (2006.01)
(52) U.S. Cl. ........................... 398/25; 398/79
(58) Field of Classification Search ....................... 398/25
See application file for complete search history.

(56) References Cited

U.S. PATENT DOCUMENTS

| | | | | |
|---|---|---|---|---|
| 6,208,865 | B1 * | 3/2001 | Veerasamy | 455/450 |
| 7,058,311 | B1 * | 6/2006 | Islam et al. | 398/140 |
| 7,123,806 | B2 * | 10/2006 | Jahn et al. | 385/134 |
| 7,464,395 | B2 * | 12/2008 | Jiang et al. | 725/93 |
| 7,509,047 | B2 * | 3/2009 | Bai | 398/30 |
| 7,609,969 | B2 * | 10/2009 | Vassilieva et al. | 398/81 |
| 2001/0009858 | A1 * | 7/2001 | Veerasamy | 455/512 |
| 2002/0141016 | A1 * | 10/2002 | Murai | 359/135 |
| 2004/0076430 | A1 * | 4/2004 | Zaacks et al. | 398/27 |
| 2006/0115271 | A1 * | 6/2006 | Hwang et al. | 398/72 |
| 2006/0130113 | A1 * | 6/2006 | Carlucci et al. | 725/118 |
| 2007/0127419 | A1 * | 6/2007 | Sapek | 370/338 |

(Continued)

FOREIGN PATENT DOCUMENTS

DE  10 2005 060256 A1  6/2007
EP  1 519 499 A1  3/2005

(Continued)

OTHER PUBLICATIONS

Sekine at al; 40 Gbit/s 16-ary (4 bit/symbol) optical modualtion /demodulation scheme; Mar. 2005; Electronics letters vol. 41 No. 7.*

(Continued)

*Primary Examiner* — Kenneth N Vanderpuye
*Assistant Examiner* — Amritbir Sandhu
(74) *Attorney, Agent, or Firm* — The Culbertson Group, P.C.

(57) ABSTRACT

A data transmission method for transmitting a digital optical signal over an optical transmission link includes creating a digital optical signal defining at least two service levels, each service level transporting information via a modulation scheme comprising at least three different modulation symbols. The data transmission method also includes transmitting the digital optical signal over the transmission link and receiving the transmitted digital optical signal at a remote end of the transmission link by demodulating the received signal and extracting the information of the at least two service levels. In case that the transmission performance is below a given threshold due to increased constraints of the transmission link a compensating action is taken to drop at least one of the service levels from the optical signal or to determine parameters associated with the transmission so as to increase one of the service levels to a predetermined quality level.

17 Claims, 8 Drawing Sheets

U.S. PATENT DOCUMENTS

| | | | |
|---|---|---|---|
| 2007/0206960 A1* | 9/2007 | Nissov et al. | 398/188 |
| 2008/0259968 A1* | 10/2008 | Forghieri et al. | 370/509 |
| 2009/0074425 A1* | 3/2009 | Tanaka et al. | 398/185 |
| 2009/0162066 A1* | 6/2009 | Ji et al. | 398/79 |
| 2009/0183048 A1* | 7/2009 | Tzannes et al. | 714/752 |
| 2009/0214212 A1* | 8/2009 | Vorbeck et al. | 398/79 |
| 2009/0238305 A1* | 9/2009 | Agazzi | 375/296 |
| 2009/0324253 A1* | 12/2009 | Winzer | 398/185 |
| 2012/0230676 A1* | 9/2012 | Mo et al. | 398/25 |

FOREIGN PATENT DOCUMENTS

| | | |
|---|---|---|
| EP | 2 068 467 A1 | 6/2009 |
| WO | WO 02/071670 A2 | 9/2002 |
| WO | WO 03/088542 A1 | 10/2003 |

OTHER PUBLICATIONS

EPO, Extended European Search Report dated Oct. 16, 2009, in European Application No. 09 006 461.9 (8 pages).

* cited by examiner

DATA TRANSMISSION METHOD AND NETWORK FOR TRANSMITTING A DIGITAL OPTICAL SIGNAL OVER OPTICAL TRANSMISSION LINKS AND NETWORKS

The invention relates to a data transmission method for transmitting a digital optical signal over an optical transmission link and a corresponding data transmission network. Moreover, the invention relates to a data transmission network realizing this data transmission method.

Optical communication networks use the standard practice of guaranteeing a service level to network users. Disturbances to a network can result in some degree of communication failure. Such disturbances include fiber breaks or other static or dynamic transmission impairments. Fiber breaks result in the complete failure of a data communication path or link. Dynamic transmission impairments generally result in degradation of link performance, in that they result in a higher bit error rate (BER) or a lower Q-factor. If dynamic transmission impairments cause sufficient degradation such that the BER crosses a given threshold, according to known data transmission methods another path is selected—resulting in an effective failure of the path with the high impairments.

An example of a dynamic transmission impairment is Polarization Mode Dispersion (PMD). In previous implementations, all data carried over a signal affected by PMD would equally be subject to degradation. If the degradation increases the BER above a level as defined by the agreed service level, the link affected would be deemed to have a critical failure, and the entire signal would be taken from another communication link or path.

Figure 1:
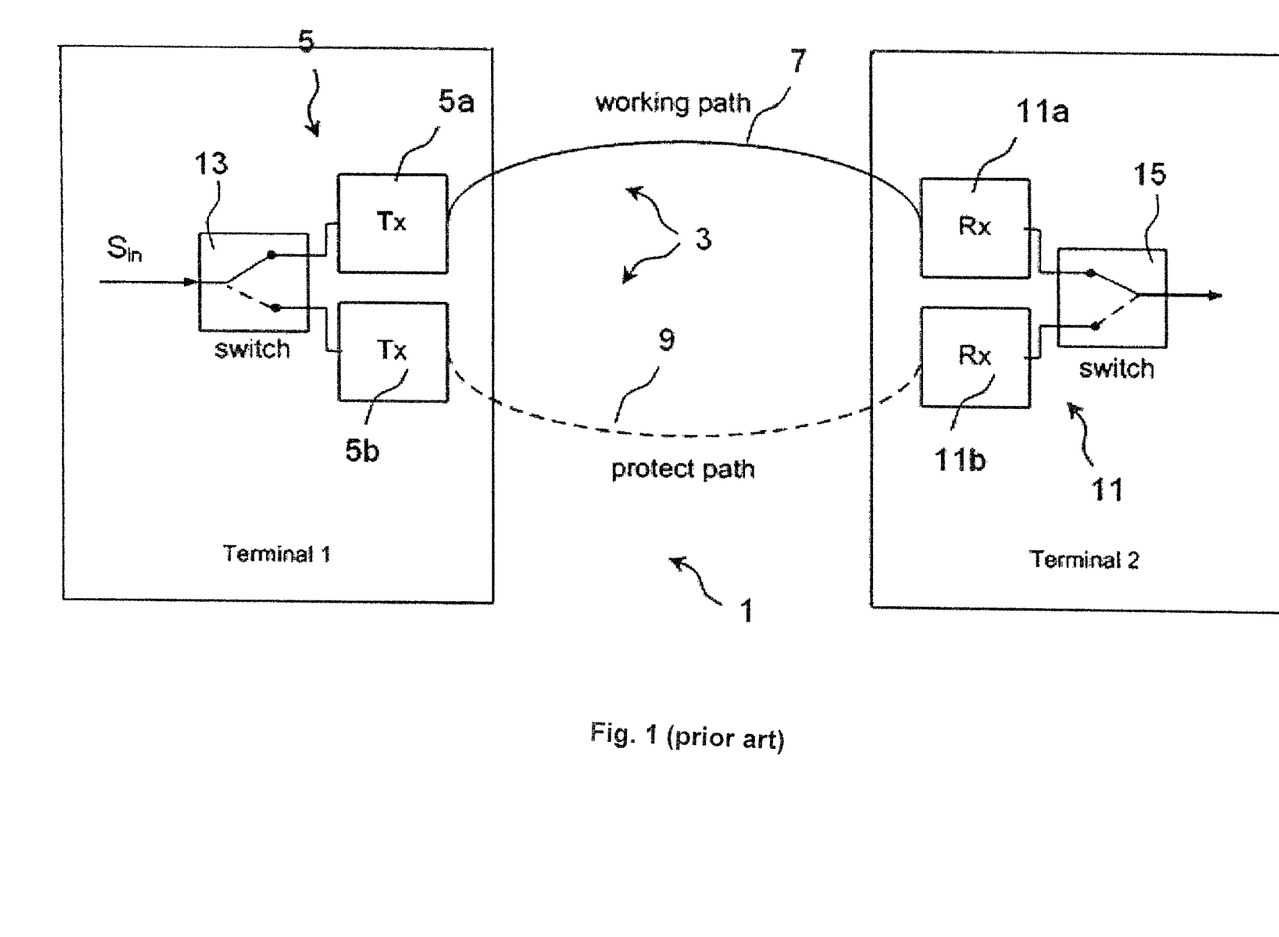
FIG. 1 shows a schematic block diagram of a path-protected simple digital optical transmission link (prior art)

When a communication path has a critical failure, it is a common measure that the network switches over to a so-called protection path as shown in FIG. 1. Here only one link 3 of an optical data transmission network 1 is shown, comprising a transmitting unit 5 at a near end of the link 3 that consists of a working path 7 and a protection path 9, and a receiving unit 11. The transmitting unit 5 includes a splitter or switch 13 connecting the input signal $S_{in}$ either to a first transmitting device 5a for transmitting an optical signal over the working path 7 or to a second transmitting device 5b for transmitting an optical signal comprising identical information over the protection path 9. At a remote end of the link 3, the working path 7 and the protection path 9 are connected to a first receiving device 11a and a second receiving device 11b of the receiving unit 11, respectively. The receiving devices receive the corresponding digital optical signal and output it to a switch 15 also comprised by the receiving unit 11. Under normal operating condition the switches 13, 15 are set such that the input signal $S_{in}$ is transmitted over the working path 6. In case the working path fails, for example due to a fiber breakage, the switches 13, 15 are controlled such that the input signal $S_{in}$ is transmitted over the protection path. The optical transmission via the protection path may be achieved by using the same or a different optical carrier wavelength. Such protection paths increase the so-called availability of end-to-end communications and thus most communication networks are built to provide these protection paths. Protection paths add cost to a network.

In partially or fully meshed networks, especially optical WDM networks, a protection path may be realized by rerouting the signal over a different path excluding the interrupted link. The transmission of the signal over the (different) protection path may be affected by using a different optical channel (this means a different optical carrier wavelength). The transmission of the signal may also be affected by the physical characteristics of the protection path. For example, the protection path may include a significantly different value of signal attenuation or dispersion.

Known protection methods and mechanisms generally use a separate protection path or a rerouted protection path using an optical protection channel in order to provide a protection path having an adequate bandwidth so as to be able to transmit the whole information included in the signal to be protected via the protection path. Thus, in a complex optical data transmission network with prior protection methods, an equal number of standby optical channels would be necessary for all of the bandwidth of the affectively failed channels. Additionally, with known protection methods, recovery of an optical channel may generally be offered at a higher networking layer, by offering various protection techniques to switch a service over to another path in the event that a given transmission link or channel were determined to incur unacceptable bit error rates.

In this state of the art, a number of back-up (or standby or protection) transceivers, equal to the number of initial so-called working transceivers, is needed which increase the installation and operational costs for these types of protected digital optical transmission networks.

It is thus an object of the present invention to provide a data transmission method for transmitting a digital optical signal over an optical transmission link allowing at least for partial protection in case of a failure in a transmission link, the data transmission method being realizable with lower network installation costs. Moreover, it is an object of the invention to provide a corresponding data transmission network implementing this data transmission method.

The invention achieves these objects with the combination of features of claims 1 and 9, respectively.

The invention provides for at least partial recovery of the signal to be transmitted over a transmission link, which is especially advantageous in case of aggregate high-speed optical data transmission. For this, according to the method of the invention, a digital optical signal (that is to be transmitted over a transmission link) is created defining at least a first and a second service level, the information transported in the first service level and the information transported in the second service level being included in the digital optical signal via a modulation scheme comprising at least three modulation symbols, all of the modulation symbols differing in at least (one value of a) modulation parameter.

For the purpose of this description the term modulation scheme shall be defined as a specific number of modulation states or modulation symbols, each modulation symbol comprising at least one given value of at least one modulation parameter. A modulation parameter may be defined by the phase or the amplitude or any other characteristic parameter of a signal transporting the information. A modulation scheme comprises at least three modulation symbols differing in at least one value of at least one modulation parameter. All modulation symbols of a given modulation scheme used for a given service level may differ from the modulation symbols used for any further service level. However, it is also possible that the sets of modulation symbols used for the different service levels "overlap". As an example, if two service levels are defined and a modulation scheme comprising three modulation symbols a, b and c is used, a first service level may use symbols a and b and the second service level may use symbols a and c. In general, two service levels must differ in alt least one modulation symbol.

It is possible that a certain service level uses one specific modulation parameter of a given number of modulation symbols (e.g. the amplitude) while another service level uses a further modulation parameter of the same set of modulation symbols (or of a predetermined selection thereof) (e.g. the phase).

Under normal operating conditions of the transmission link, the modulation parameters of modulation scheme and/or receiving parameters and/or transmission parameters of the transmission link are statically or dynamically determined such that the transmission performance with respect to the information transported in said first service level and/or the transmission performance of said transmission signal with respect to the information transported in said second service level reach predetermined quality levels. In this respect, the term "quality level" shall be understood as any measure defining an error-free detection of the signal transmitted at the remote end of the transmission link or at least a detection providing an acceptable error rate. For example, determining the bit error rate or the Q-factor of the received signal or a part of this signal (for example a sub-signal) may be used in order to assess the quality level (of the data transmission over the corresponding link).

Defining at least two service levels the invention allows to drop or prefer one or more of these service levels in case of increased constraints of the transmission link, for example when PMD is increased within the (unchanged) path of the transmission link or in case the path is changed by rerouting the link, the rerouted path revealing increased constraints. This means, in case of increased constraints the preferred service level(s) can be maintained to be further transmitted on the path having the increased constraints whereas the information included within the other (lower) service level(s) is either further degraded in transmission quality or lost or transmitted via a different path to the desired destination or terminal. It is also possible to predefine which of the at least two service level(s) are to be maintained (higher service level) and which of the service level(s) may be dropped or rerouted over another path.

According to an embodiment of the invention, said digital optical signal to be transmitted over the respective transmission link is created by combining a plurality of client signals which transport information that is fully included either within the first or within the second service level. In this way, it is possible to include certain predefined client signals into preselected service levels, where the service levels can be represented by respective sub-signals included in the digital optical signal.

Under normal operating conditions, the modulation parameters of the modulation scheme and/or receiving parameters and/or transmission parameters of the transmission link may be statically or dynamically determined such that the transmission performance with respect to the information transported in said first service level is better than the transmission performance with respect to the information transported in said second service level. In this way, it is for example possible to transport the information included in a first service level with a lower bit error rate than the information included in the second service level, which means that the first service level has a higher tolerance with respect to increased constraints of the given (or a reconfigured) transmission path than the second service level. In general, if more than two service levels exist, a service level priority may be created in this way.

According to a preferred embodiment of the invention, in case one or more service levels are dropped, the modulation parameters of the modulation scheme and/or receiving parameters and/or transmission parameters of the transmission link may be statically or dynamically determined such that the transmission performance with respect to the information transported in said remaining service levels or the transmission performance with respect to the aggregate information transported in the digital optical signal reach predetermined quality levels. The information included within the other service level(s) may either be (partially) lost or the corresponding information may be included in a signal that is rerouted to the desired terminal over another (protect) path.

In this way, costs for a corresponding transmission network can be reduced as (at least on the average) the bandwidth of the protect paths may be lower than in networks which provide for full rerouting of the signal to be protected in case a selected transmission path which does not fulfill the transmission requirements for the whole (high speed) signal.

According to an embodiment of the invention increased constraints of the transmission link (or the transmission performance of the aggregate digital optical signal or the transmission performance of one or more sub-signals) can be detected by determining the bit error rate or the Q-factor of the signal received or by determining the bit error rate or Q-factor of one or more received sub-signals comprising the information included within a given service level.

In this way, the modulation parameters of the modulation scheme and/or the receiving parameters and/or transmission parameters of the transmission link can be controlled such that, after having dropped one or more service levels, the bit error rate (or Q-factor) of the aggregate digital optical signal or the bit error rate (or Q-factor) of the remaining sub-signals reach predetermined minimum (or maximum) values, respectively.

According to an embodiment of the invention, a respective part of the modulation symbols of said modulation scheme is exclusively used for encoding the information transported in a respective service level. In a further embodiment the modulation symbols are chosen such and the digital optical signal is created such that the information included in the first service level is included in an amplitude shift keying modulation portion and that the information included in a second service level is included in a phase shift keying modulation portion.

Further embodiments of the invention are apparent from the dependent claims.

The invention will now be described in more detail with reference to the drawings in which.

Figure 2:
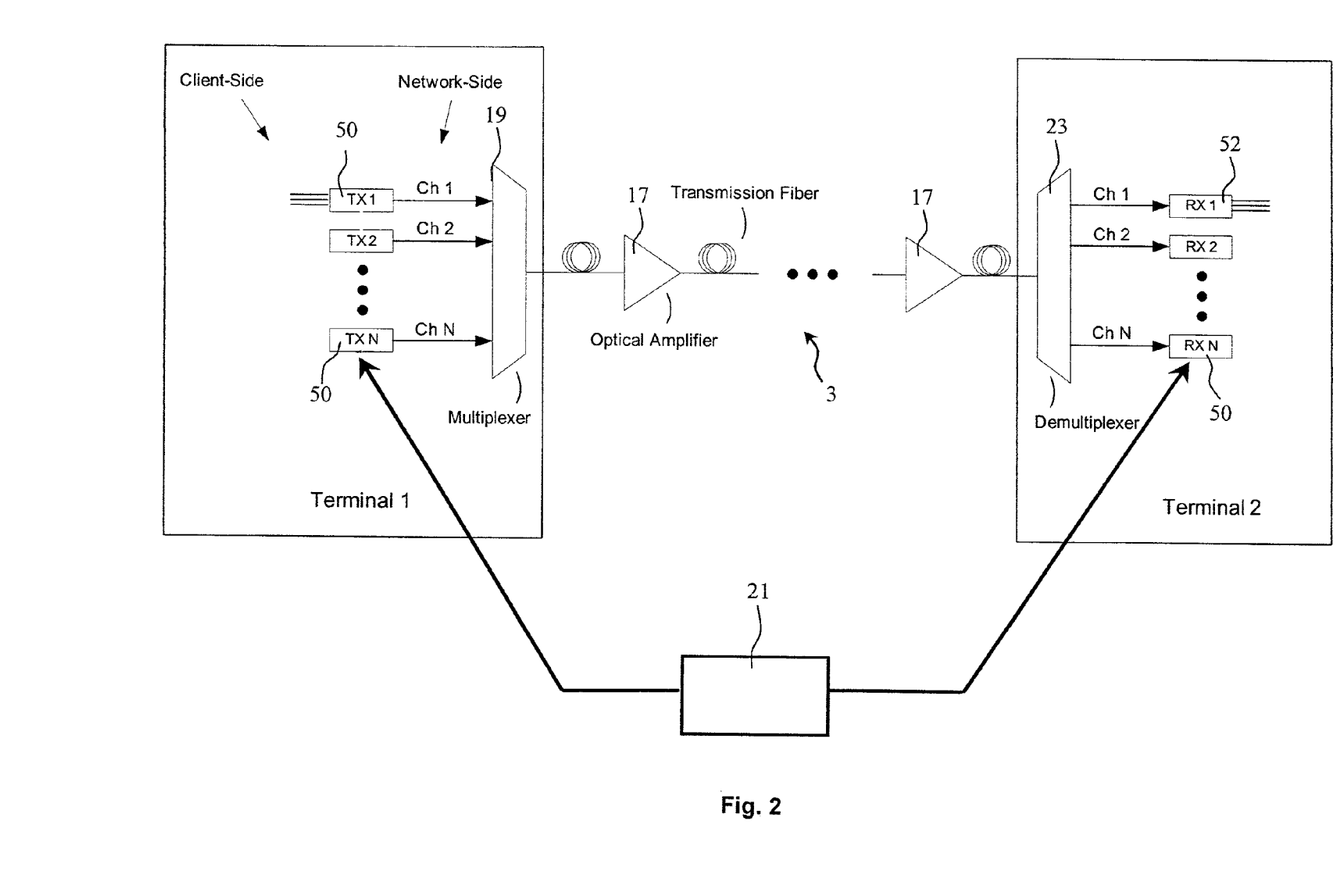
FIG. 2 shows a schematic block diagram of a digital optical WDM transmission link comprising optical amplifiers.
Figure 3:
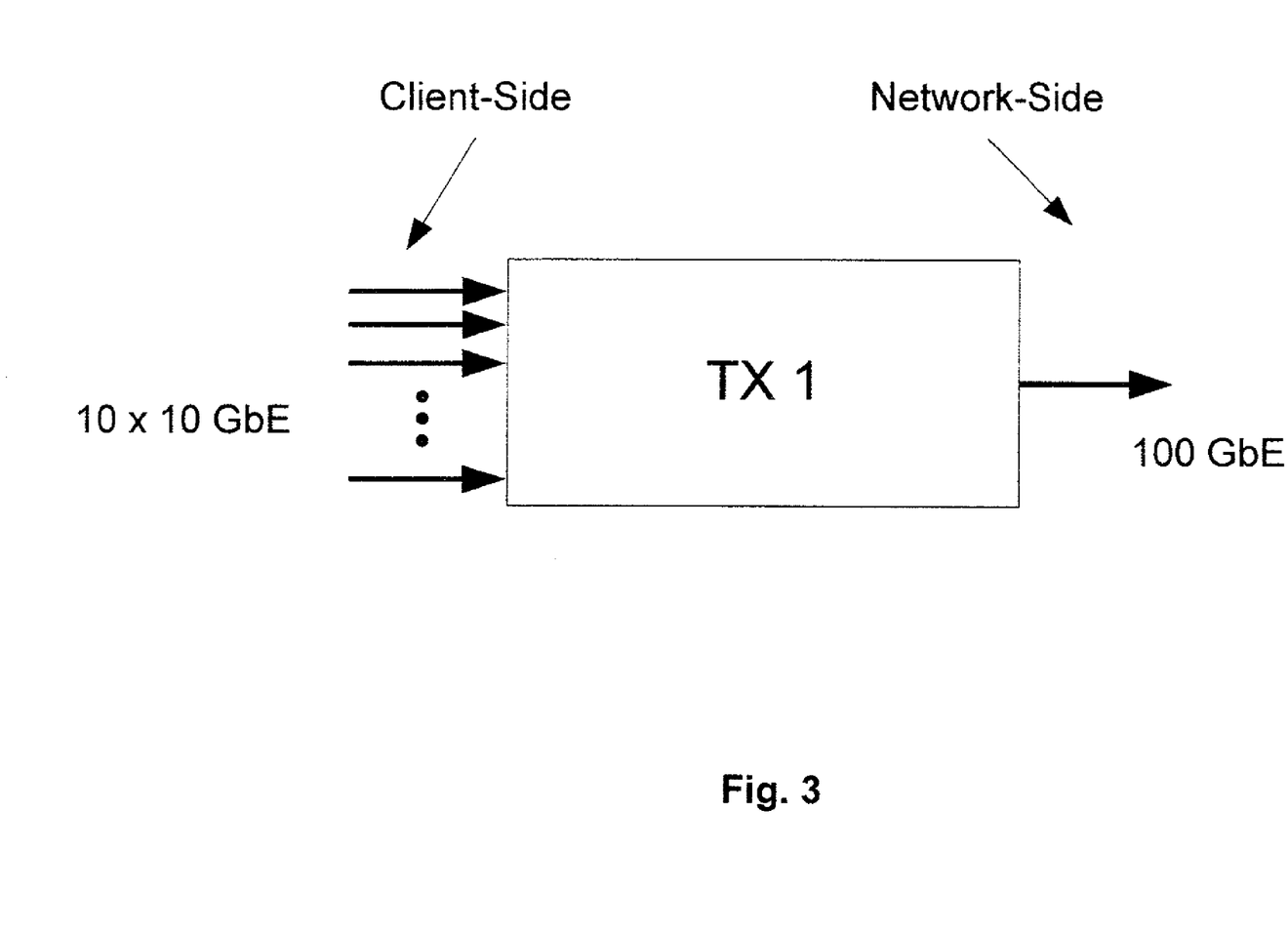
FIG. 3 shows a schematic representation of a modulating and transmitting unit combining ten client signals to an digital optical signal to be transmitted over the transmission link according to FIG. 2.

The digital optical network 1 shown in FIG. 2 is a digital optical wavelength division multiplex (WDM) transmission network comprising a transmission link 3 between a first terminal (terminal 1) and a second terminal (terminal 2), the transmission link carrying N optical channels or channel signals Ch1 to ChN which are created by respective modulating and transmitting units 50. In the example shown in FIG. 2, each modulating and transmitting unit 50 receives ten client signals, for example ten 10 Gbit Ethernet (GbE) signals (see FIG. 3), and combines these client signals to the respective digital optical channel signal Ch1 to ChN to be transmitted over the transmission link 3. The transmission link 3 consists of a number of sub-links or spans with a corresponding number of optical amplifiers 17. The optical channel signals Ch1 to ChN are combined using an optical multiplexing unit 19. The network-side optical channel signals are 100 GbE signals in case that, as shown in FIG. 3, each modulating and transmitting unit 50 combines ten 10 GbE client signals. Of course, the number of client signals and the corresponding data rates may vary. For example, the invention can also apply to 40 GbE client signals, or to Ethernet rates controlled or throttled by a router.

Generally, a WDM system or DWDM system (dense WDM) is limited by the number of spans and span length that can be supported. This limitation is effected by impairments such as amplified stimulated emission (ASE) noise, chromatic dispersion (CD), or polarization mode dispersion (PMD).

The modulating and transmitting units 50 do not produce simple ASK modulated channel signals as are used in most existing digital optical transmission networks, but create digital optical channel signals Ch1 to ChN each containing at least a first and a second service level, the first and second service level comprising information included in the digital optical signal via a modulation scheme including at least three modulation symbols. Each modulation symbol is defined by one or more specific value of respective modulation parameters (see FIG. 9 which show "two-dimensional" modulation schemes wherein each modulation symbol is defined by a specific amplitude value and a specific phase value). Under normal operating conditions of the transmission link, the modulation parameters of the modulation scheme and/or receiving parameters and/or transmission parameters of the transmission link are statically or dynamically determined such that the transmission performance with respect to the information transported in said first service level and/or the transmission performance of said transmission signal with respect to the information transported in said second service level reach predetermined quality levels. For this control task, a separate control unit 21 may be provided which is connected to the modulating and transmitting units 50 and/or to receiving units 52. The receiving units 52 each receive a received optical channel signal $Ch1_{RX}$ to $ChN_{RX}$ at the remote end of the transmission link 3. The received optical channel signals $Ch1_{RX}$ to $ChN_{RX}$ are extracted from the transmitted digital optical WDM-signal by means of an optical demultiplexing unit 23. Additionally, the control unit 21 may be connected to one or more devices influencing the transmission characteristic or transmission parameters of the transmission link 3, like tunable dispersion compensating means. Such devices may of course also be included in the receiving units 52.

An increase in transmission constraints of the link 3 (for example due to an increase of PMD) can be detected by the control unit 21 (a part of which might be present within the receiving units 52) through measuring the bit error rate or the Q-factor of the received aggregate channel signals $Ch1_{RX}$ to $ChN_{RX}$ or of the single sub-signals comprising the information of the respective service levels. It is also possible to assess the transmission performance of the sub-signals by measuring the respective parameters of one or more client signals, if more than one client signal is included in such sub-signals, as the case may be.

If the control unit 21 detects increased transmission constraints that do not allow the transmission of the channel signals $Ch1_{RX}$ to $ChN_{RX}$ with the desired or predetermined transmission performance it controls the modulating and transmission units 50 such that the sub-signal corresponding to one or more respective service levels are dropped from being included in the respective channel signal $Ch1_{RX}$ to $ChN_{RX}$. The dropped signals may be rerouted to the corresponding terminal via another (protect) path.

The modulation scheme is designed such and the creation of the transmitted digital optical channel signal $Ch1_{RX}$ to $ChN_{RX}$ is effected such that dropping as sub-signal or a respective service level leads to a reduction of modulation symbols used for the transmission of a channel signal (of course, if only two service levels are used, at least two modulation symbols must remain for the service level left over after dropping the other service level). This per se may lead to an increase of the transmission performance (decreased bit error rate or increased Q-factor) for the remaining channel signal $Ch1_{RX}$ to $ChN_{RX}$ including the remaining service level(s) as mutual negative influences between the sub-signals are avoided.

Additionally, the control unit is able to tune the modulation parameters of the modulation scheme (with respect to the remaining modulation symbols) and/or receiving parameters and/or the transmission parameters such that the transmission performance for the remaining channel signal $Ch1_{RX}$ to $ChN_{RX}$ or the transmission performance with respect to the remaining sub-signal(s) is optimized or reach predetermined values. Also in this case it is possible to define higher and lower service levels if the remaining channel signals $Ch1_{RX}$ to $ChN_{RX}$ still include more than one service level (i.e. more than one sub-signal). The above-mentioned parameters can be determined such that a sub-signal corresponding to a higher service level encounters a lower bit error rate (higher Q-factor) than a sub-signal corresponding to a lower service level.

As the sub-signals defining the respective service levels usually reveal different sensitivities to certain transmission constraints (depending on the modulation scheme and the specific encoding of the client signals or sub-signals) the control unit 21 can control the above-identified parameters even under normal operating condition (with no service levels dropped) such that the respective complete channel signal Ch1 to ChN (or the respective combined WDM signal) is transmitted over the link 3 and received at the remote end of the link 3 with a sufficient quality level or transmission performance where simultaneously higher and lower service level may be defined. In case of increased constraints, some of the service levels can be preferred by tuning (one or more of) the above-mentioned parameters. Of course this may adversely affect the other service level(s) as the choice for the parameters for the normal working conditions will usually be a compromise for both (or all) service levels and corresponding modulation symbols. As explained above, if the transmission performance of the non-preferred lower level services is unacceptably low, the control unit 21 may drop one or more of these service levels.

However, providing different service levels within the (channel) signal(s) to be transmitted over a given link is not only advantageous if in case of increased constraints the corresponding modulating, transmission or receiving parameters are tuned so as to prefer a predetermined service. The channel signals Ch1 to ChN may also be created such that the information comprised in the different service levels reveals predetermined tolerance levels with respect to certain given increases in static or dynamic transmission constraints (like PMD, CD etc.). The more important information may for example be transported in the first service level that includes the information of given client signals. This first service level may be designed such that the corresponding sub-signal (of the respective channel signal Ch1 to ChN) defined by the respective modulation symbols is more tolerant of certain increased constraints than the sub-signal defined by the respective other modulation symbols (of the modulation scheme used) forming the second service level which includes the respective other channel signals.

Even such static service levels can be used to provide at least partial availability of the link with respect to one or more given or all channel signals in case of increased constraints. The information included in the respective other service level or sub-signal may then be dropped (or rerouted on a higher protect level via another transmission route in case of a meshed transmission network).

In the following, it will be explained how this method of using different service levels may contribute to saving installation costs of an optical network.

Figure 4:
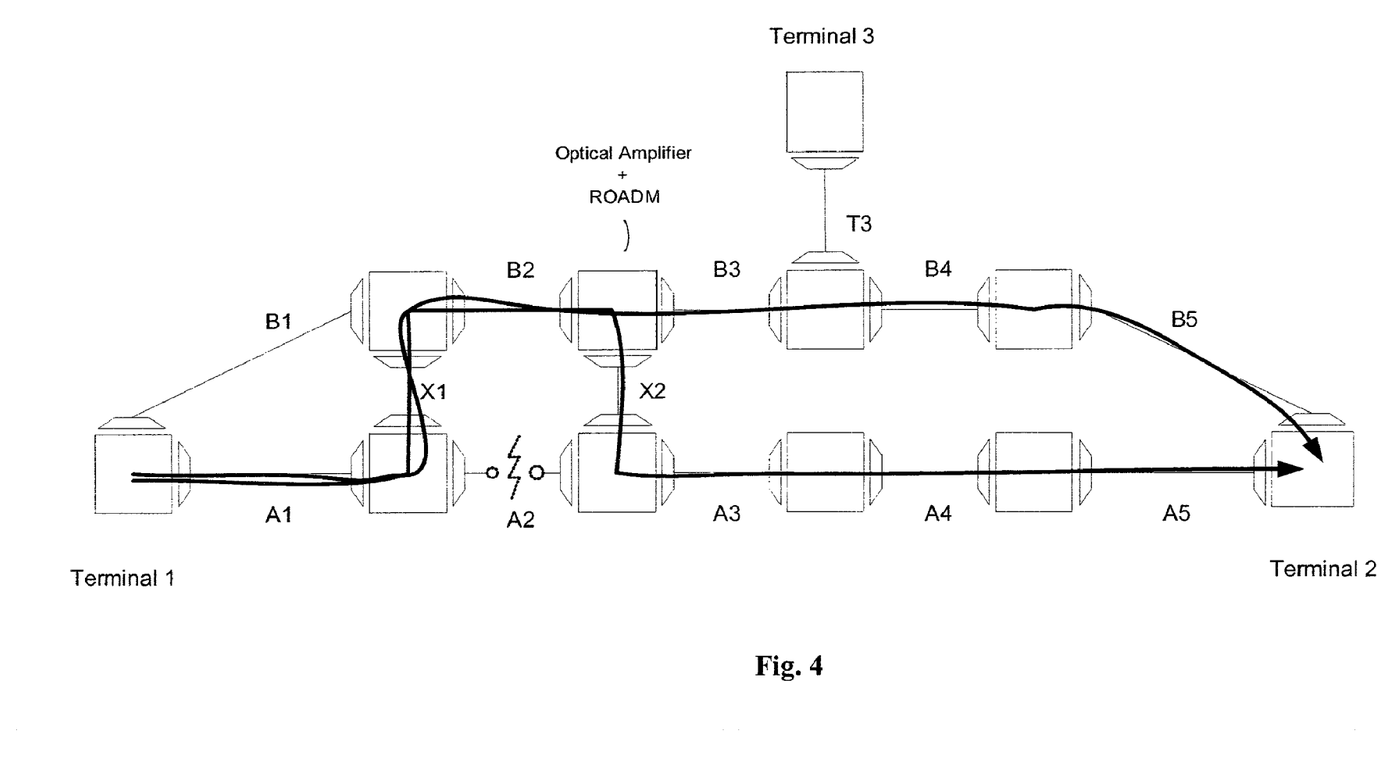
FIG. 4 shows a schematic representation of a meshed network comprising three terminals.

For this purpose a network example as shown in FIG. 4 shall be considered. Three terminals (terminal 1 to terminal 3) can be connected via reconfigurable optical add-drop multiplexers (ROADM) defining network nodes of the order two or three. The ROADM's shall also include optical amplifier functionality. Each terminal has a structure as shown in FIGS. 2 and 3 for each connected link. As a terminal usually supports full duplex transmission, both a transmitting structure as shown for terminal 1 in FIG. 2 and a receiving structure as shown for terminal 2 in FIG. 2 may be provided for each connected link (or span). For the further explanations it is assumed that 100 GbE channel signals (combined to a corresponding WDM signal) are transmitted over the network. Any 100 GbE channel signal shall have a so-called reach or maximum ability of 5 fiber links or spans (A1, A2, A3, A4, A5, B1, B2, B3, B4, B5, T3, X1, X2). The reach is determined by actual physical characteristics (for example, loss) of the links, but for simplicity sake, in this example, each individual fiber link or fiber span shall be equal; however, it does not change the fundamentals of the present invention, if variation of links is taken into account. The optical amplifiers included in the ROADM's between each fiber link offer power gain to the WDM (and each channel) signal, but adds noise at each amplifier location and therefore limits the number of times a signal can be successfully amplified.

The example network shown in FIG. 4 comprises paths A and paths B between terminals 1 and 2, reserve capacity (comprised of reserved channels, transmitters and receivers) is kept on both paths to ensure protection in the event of a fiber cut or otherwise "failure" along either path. If path A fails, the traffic along A is rerouted to the reserve capacity on path B. For every transmitter and receiver (transceiver) working along path A, a spare and redundant transceiver must be kept ready along path B in case path A fails. This is true for many network architectures when the equipment is card-protected, meaning that the redundant cards are kept along path B in the case that the transceivers themselves of path A were to fail (otherwise a protection switch could be utilized).

Here, a total of 400 Gb/s of traffic (WDM signal) between terminal 1 and terminal 2 on paths A1-A5, made up of 4×100 GbE channel signal, shall be considered. If fiber link A2 breaks or otherwise is determined to fail (for example could be from high PMD events along A2), the traffic is rerouted to paths B1-B5. Four 100 GbE transceivers must be on standby at terminal 1 and four 100 GbE transceivers must also be on standby at terminal 2 to support this protect path. A total of eight 100 GbE cards are kept in reserve for this protect path.

It shall be noted that this network has ROADM functionality to reroute between A and B paths, to possibly utilize paths X1, X2 or X3. This mesh architecture allows a signal to be rerouted at intermediate nodes between any two terminals. A channel between terminal 1 and terminal 3 could be routed to travel either B1-B2-B3-T3 or A1-A2-A3-X3-T3. The mesh architecture mostly allows more than two unique path combinations to be possible between any two nodes. Although between terminal 1 and terminal 2, there are only A1-A2-A3-A4-A5 and B1-B2-B3-B4-B5 as possible paths without requiring greater than five fiber spans to be used, which would necessitate regeneration.

Also it may not be only the number of spans (generally optical signal-to-noise ratio (OSNR) degradation for these purposes) that could prohibit certain rerouting paths, but also differences in accumulated PMD or residual chromatic dispersion (RCD).

In case route B (spans B1 to B5) reveals more than the maximum non-regenerated reach of five spans, additional signal regeneration is necessary in order to provide protection functionality. This means that at latest after five spans a given corresponding network node must provide regeneration ability by providing two extra transceiver cards for every channel signal (or at least one dedicated regeneration card) to regenerate (detect, regenerate and subsequently retransmit) the channel signal along route B. Considering again 400 Gb/s of traffic, then the following equipment is kept standby for the protect path on route B: Four 100 GbE transceiver cards at terminal 1, eight 100 GbE transceiver cards (or four 100 GbE regeneration cards) at the given node that provides regeneration functionality and four 100 GbE cards at terminal 2.

In conventional optical networks if a channel signal is protection rerouted via a ROADM, but the constraints (for example residual dispersion or the PMD) are too great in the new path, then this was a failed circuit. The rerouting would need to take place on a higher level, the router level, which may take several hundreds of milliseconds, rather than the less-than-50-millisecond standard in optics. The rerouting decisions at the router level, however, do not take into account optical physical constraints, and so for example the transit delay (latency) may be too great with a reroute. Even if the rerouting were determined by a fast optical cross connect product, there is extra expense in reserving 100% of the bandwidth also in the reserve path. If only approximately 50% of a channel needed rerouting, then the protection bandwidth would have a reduced requirement.

By providing at least two service levels in the signal to be rerouted (channel signal), the same "availability" of the network through the same protect paths can be achieved, but due to reduced equipment requirements costs, of the protect path(s) are reduced.

Rerouting of optical wavelengths via ROADM mesh network solutions may incur residual chromatic dispersion (CD) or PMD that is outside the pre-designed range. However, the higher service level information (or data) that is part of the aggregate higher-speed channel signal can be created such that it is capable to withstand increased amounts of chromatic dispersion and PMD and OSNR (note that electronic compensation techniques may recover CD and PMD, but not OSNR). Rather than experiencing a total failure of the communications channel, the higher service level portion of the channel may actually experience error-free transmission, while the lower service level portion experiences errors.

Using a suitable modulation scheme and a suitable use of corresponding sets of modulation symbols for each service level, a specific client interface or lower-speed input channel can be made to belong to a specific portion (service level) of the high-speed aggregate channel, and the characteristics of the high-speed channel and/or the characteristics of the processing of the high speed channel can be modified to create differentiated performance levels for each lower-speed client interface. For the purposes of this description, the term "client signal" shall comprise any type of lower-speed signal the information of which is comprised by the corresponding service level.

In this way partial usage (for example 40 percent or 60 percent) of an optical channel can be realized when physical network constraints do not allow the full usage of the channel. In most prior art networks, if full usage was not available, the channel would be shut down completely in favor of another communication path. However, allowing partial usage of a channel reduces costs in networks that require protection paths, and can also offer increased availability in a network that does not utilize protection paths.

In the following the invention will be described in terms of a specific, combined amplitude- and phase-shift-keying modulation scheme. However, the specific modulation symbols of this modulation scheme assigned to the different service levels are used here only for illustration purposes. Other advanced modulation formats may be used to realize the general principle without leaving the scope of the invention.

Given a combined differential-phase-shift-keying (DPSK) and amplitude-shift-keying (ASK) modulation scheme for an optical data channel, this aggregate signal is designated as a DPSK-ASK signal. As the name implies, it modulates information with changes in phase of the optical signal and with changes in amplitude of the optical signal. For the purposes of describing the creating (in a fixed way or dynamically) of service levels within a single optical channel, the aggregate DPSK-ASK channel signal Ch1 to ChN shall be considered to have a data-rate of 100 Gb/s. The transmitter/receiver module generates this 100 Gb/s network data channel by combining ten lower-rate client signals; each client signal shall be considered to have a data rate of 10 Gb/s.

The DPSK-ASK data channel carries information in both its DPSK and ASK portions (channel sub-signals) separately. The information content in the DPSK portion shall be 40 Gb/s and the information content in the ASK portion shall be 60 Gb/s. It can be designed such that four client 10 Gb/s channels are DPSK encoded, and six client 10 Gb/s channels are ASK encoded for modulation.

The DPSK-ASK channel can originally be constructed to equalize transmission characteristics between the DPSK and ASK channel sub-signals. However, often the DPSK and ASK channel sub-signals cannot be equalized in performance, and the DPSK channel sub-signal may have inherently better performance, when the overall performance of the channel is optimized; in other words, if the DPSK and ASK channel sub-signals are initially equalized, it would be at the expense of the overall performance of the channel. Additionally, modulation characteristics can be modified (either fixed initially or set dynamically) to yield improved performance in one of the channel sub-signals at the expense of degradation of the other sub-signal.

If an initial condition or change in transmission impairments leads to errors on the equalized DPSK-ASK channel signal, these errors would occur equally between the DPSK and ASK sub-signals. At this point, if there is a client 10 Gb/s signal that should have a higher service level, then it could be made to be specifically part of the DPSK (or ASK) sub-signal, and the modulation parameters (especially the modulation levels) could be modified to boost the performance of the DPSK (or respective ASK) signal so that it could handle increased transmission impairments. This change would increase the bit errors in the ASK (or respective DPSK) signal, but would preserve some portion of the overall aggregate 100 Gb/s signal by providing error-free performance for some number of clients, rather than all clients experiencing errors and the entire 100 Gb/s channel being disabled.

The ASK modulation in this example is a so-called 3-ASK signal, meaning that it has three amplitude levels. However, the invention can also be realized with 2, 4, or n-number of ASK levels, as well as with other modulation formats explained below with reference to FIG. 9. If the highest amplitude level (the third amplitude level) is normalized to "1", then the first and second amplitude levels are adjusted and as a result change the Q-factor for the ASK and DPSK channel signals. The DPSK signal degrades as the first amplitude level approaches a value of zero.

Figure 5:
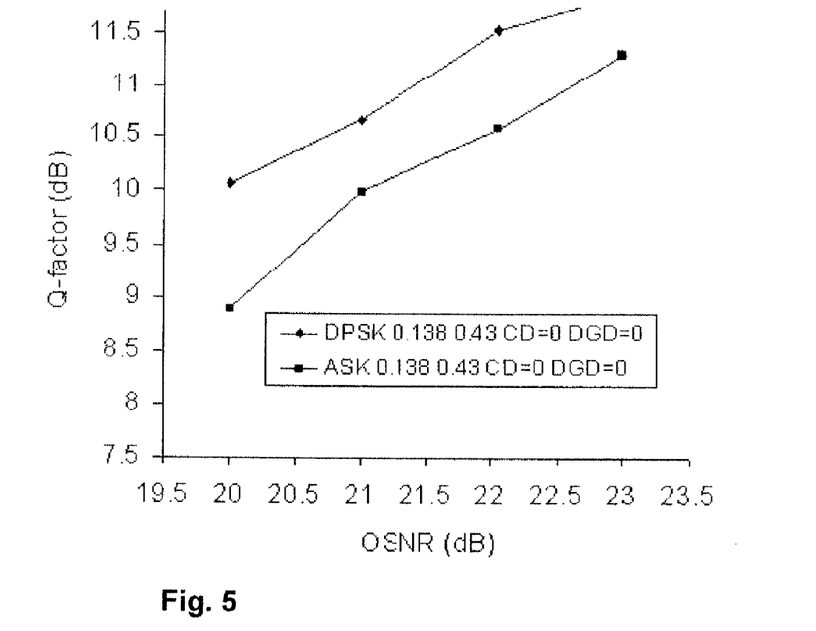
FIGS. 5 to 8 show diagrams showing the Q-factor versus OSNR for two different modulation schemes of ASK and DPSK.

FIG. 5 shows as an example the performance for a 100 Gb/s signal comprised of DPSK and ASK modulation. The results shown are for normalized modulator driving voltage levels of 0.138 for the first level, and 0.43 for the second level; residual Chromatic Dispersion (CD)=0; PMD, or differential group delay (DGD)=0. These modulator set-points produce optimized performance (overall lowest BER) for a return-to-zero (RZ) (with 50% duty cycle) based DPSK-ASK signal. FIG. 5 illustrates that when the total channels performance is optimized, there is a difference in Q-factor for the DPSK channel sub-signal and for the ASK channel sub-signal. A Q-factor approximately equal to 9 dB or higher is needed for error-free performance of the system. FIG. 5 shows that for OSNR values above 20 dB, error-free performance is met. For OSNR values equal or less than 20 dB, the ASK portion of the 100 Gb/s channel sub-signal begins taking some errors. If a channel with an initial OSNR=21 dB changed to OSNR=20 dB, the DPSK portion would remain error-free while the ASK would not.

Figure 6:
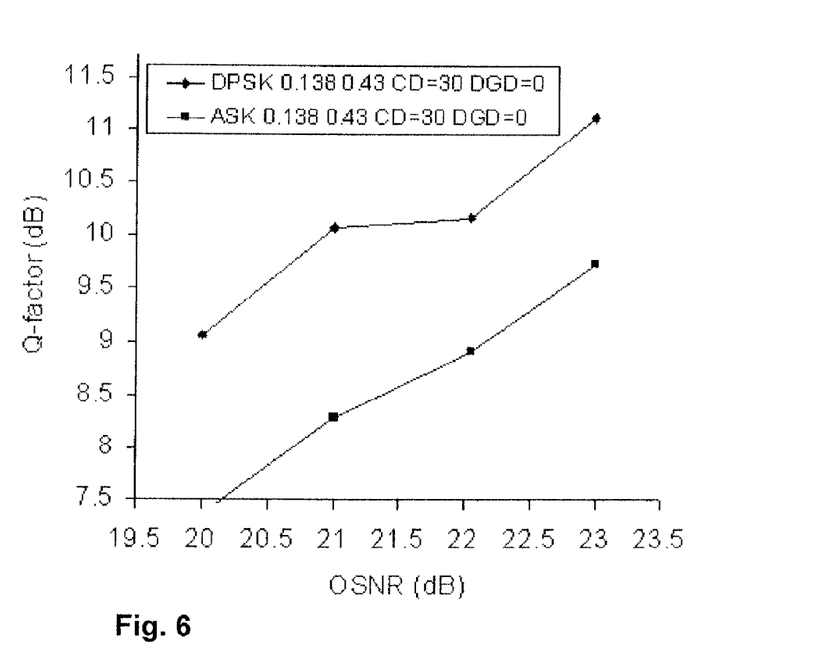

FIG. 6 shows the same DPSK and ASK components, with the same modulator voltage setpoints, but now for residual CD=30 ps/nm. For values of OSNR>22,the entire channel can remain error-free. For OSNR equal to or less than 22, the ASK portion takes errors. Similarly in FIG. 7, showing residual CD=0 ps/nm but now with DGD=8 ps: for OSNR values of approximately 21.5 dB or less, the ASK portion takes some errors.

Figure 7:
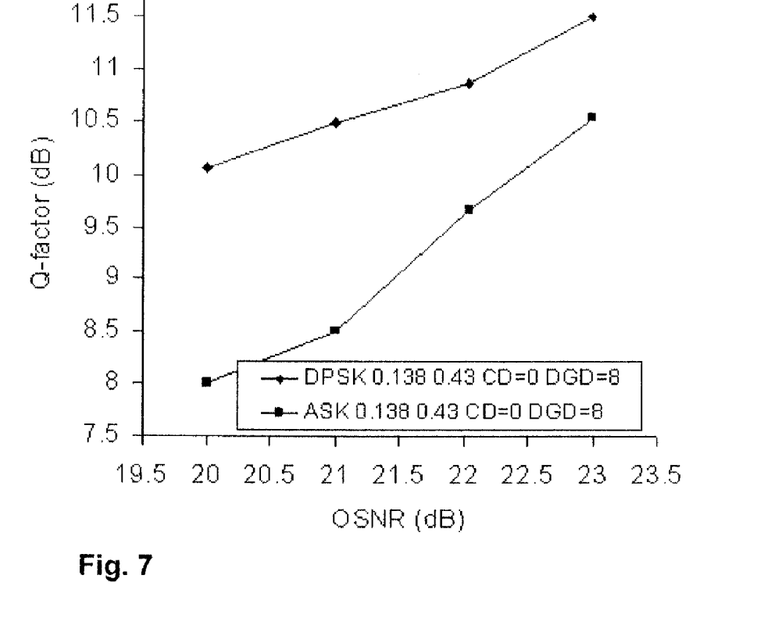

FIGS. 5 to 7 demonstrate that for a channel experiencing a changing value of DGD, or for a channel that is rerouted in a mesh network via ROADMs, the DPSK channel sub-signal is more robust to increases in PMD or residual CD, respectively.

Figure 8:
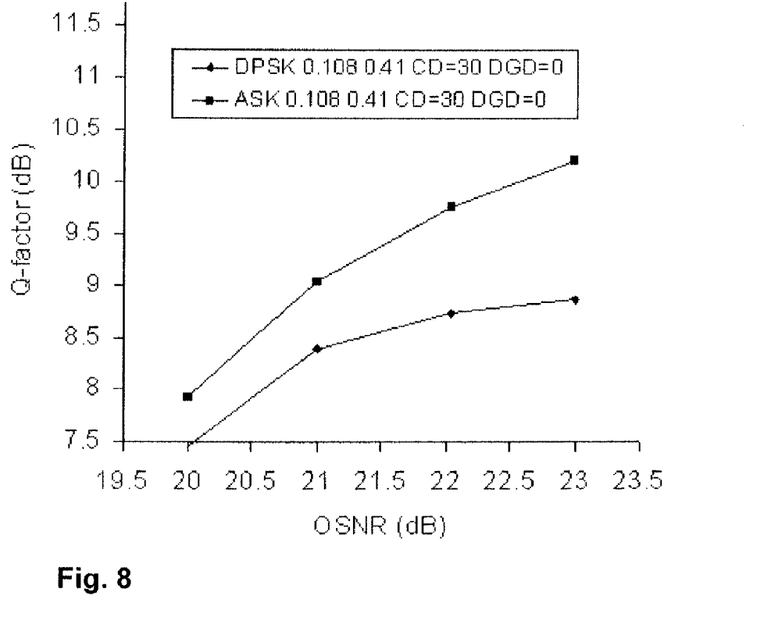

FIG. 8 shows the possibility of dynamically changing the driving voltage levels to the modulator of the modulating and transmitting unit to favor the ASK portion, at the expense of the DPSK portion. If the higher service level is desired from the ASK portion of the channel, this means the ASK channel sub-signal, to allow 60% of the channel to receive the higher performance, the modulator could for example be driven at level one equal to 0.108 and 0.41. FIG. 8 shows this results in a higher ASK performance, specifically shown for CD=30 ps, but is also a general result. FIG. 8 shows that for an OSNR=21 dB or more, ASK gives error-free performance while DPSK does not.

Allowing for this partial utilization of a high-speed network channel, equipment costs could be reduced in the cases and scenarios introduced above with reference to FIG. 4.

While previously only paths either entirely along route A or entirely along route B were feasible (with regeneration if necessary) for communication between terminal 1 and 2, the network now has the ability to reroute channels carrying partial capacity along several different combinations of specific fiber spans.

For example, FIG. 4 demonstrates a situation with a failure on span A2. A channel carrying partial capacity can be rerouted in a number of different ways to allow for the possibility of more than one fiber failures, or for example a situation in which the specific wavelength (frequency channel) was already being utilized between terminal 1 and terminal 3 which did not allow spans B4 or B5 as possibilities. In the example, if fiber link A2 is determined to fail, a channel having travelled A1-A5 could now be rerouted to travel A1-X1-B2-B3-B4-B5 or A1-X1-B2-X2-A3-A4-A5.

This rerouting also allows cost savings in the basic case where there is a single failure (for example) in span A2 and where there is no wavelength blocking scenario. This savings will now be described. Given the failure at A2, say that the rerouting A1-X1-B2-B3-B4-B5 is chosen which results in six spans. Regeneration can be avoided along such a path if the channel is scaled back to utilize 40% or 60% of its capacity, thereby increasing its performance (or simply utilizing the portion of the channel that inately has higher performance). If for example 60% of the capacity can be rerouted to A1-X1-B2-B3-B4-B5 without switching over to protection equipment, this results in lesser protection equipment needed for standby. Now, only 40% of the capacity needs to be kept as standby. So in the scenario where 400 Gb/s of traffic is being carried, now 240 Gb/s have been maintained on the primary transceivers now routed A1-X1-B2-B3-B4-B5, and 160 Gb/s must be switched over to protection transceivers. Previously, a total of eight 100 GbE cards are kept in reserve for this protect path (four transceivers at each terminal 1 and terminal 2). Now, only four 100 GbE cards are kept in reserve for this protect path (two transceivers at each terminal 1 and terminal 2). Note that this 200 Gb/s of protection capacity is available to protect 160 Gb/s, so 40 Gb/s is available as unprotected capacity, which could be an extra revenue-bearing service.

As a further possibility, a total of six 100 GbE cards could kept in reserve for the protect path (three transceivers at each terminal 1 and terminal 2). This still reduces the number of necessary protection transceivers from the base case, but allows for the possibility of multiple different paths in the protection scheme, since each of the 100 GbE cards could be using 60% capacity allowing 180 Gb/s of protection, which allows more robustness to fiber impairments. And again in this case, there is additional capacity (20 Gb/s) left over that could be used to sell an unprotected service.

The data transmission method explained above creates the possibility, via hardware and software, in a WDM or DWDM transport system, to allow a channel to remain in service, even if the overall error rate increases, thereby not causing disruption to the portion of the channel not incurring errors, whereas in previous solutions, errors were randomly distributed to each tributary of the channel and thus the entire channel would be shut down if the overall error rate crossed some defined threshold value. Additionally, once errors occur in part of a channel, the modulator driving voltage levels or other modulating parameters and/or transmission parameters and/or receiving parameters can be modified to further increase the performance of the portion of the channel that is remaining in service.

The design of a network, with the data transmission method discussed here, would or could still employ the higher networking layer protection techniques (for example router protection). However, this method introduces a service level capability on the optical channel level which would relieve some of the requirements of the higher networking layer protection, thus relieving some of the additional costs required to ensure all service level is maintained via the higher networking layer.

By not using the higher networking layer protection techniques, not only are cost-savings realized, but performance gains can further be noted by not having a communication path undergo the multiple hundreds of milliseconds required for a router to find an alternative path.

Figure 9:
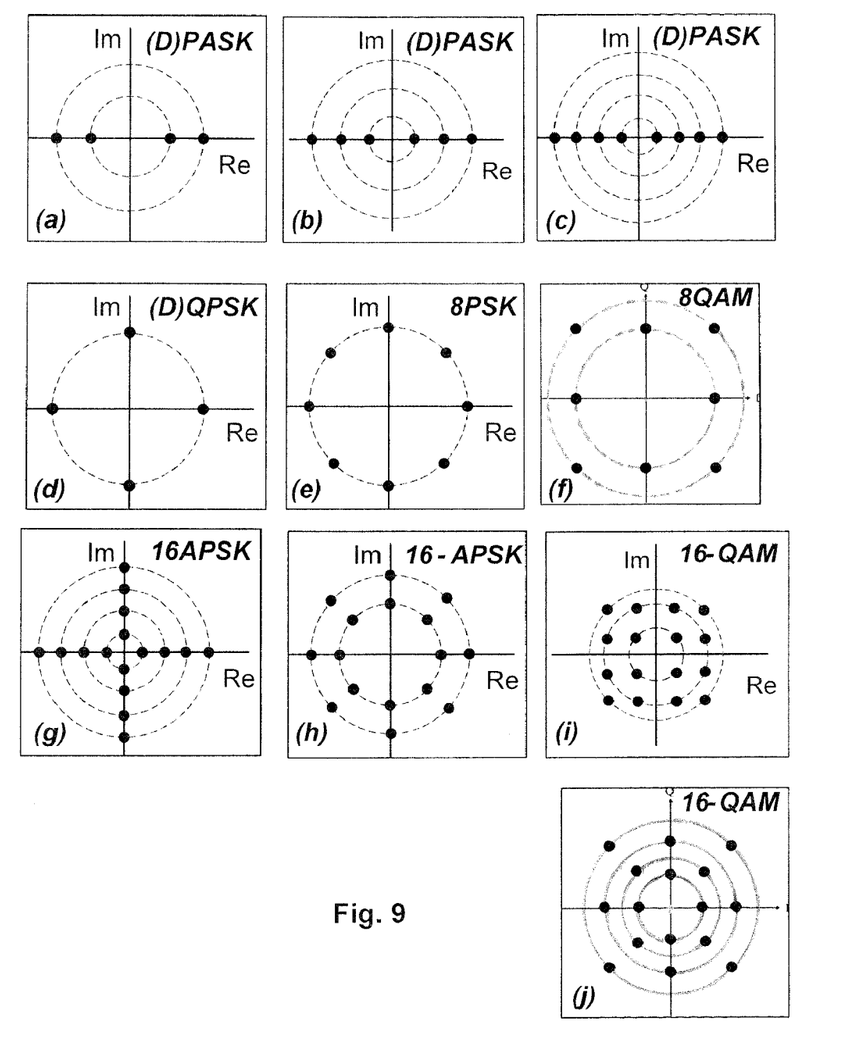
FIG. 9 shows schematic representations of different possible combinations of modulation schemes combining digital ASK and (D)PSK and FIG. 10 shows a general flow-chart of a control routine of a control unit used in a transmission network according to the invention.

Other modulation formats can be used to implement the multiple levels of service within a single optical channel. The invention is possible due to the separate encoding of specific client-side tributary channels using a specific modulation scheme comprising at least three modulation symbols and effecting the modulation in a way that there is a given difference in performance between the different sub-signals or service levels and/or differences can be tuned between the different sub-signals or service levels. In the example above, client tributaries or client signals were separated between the DPSK encoding and the ASK encoding. Several "constellation" diagrams are shown in FIG. 9. Terminology of combined phase-shift-keyed methods and amplitude-shift-keyed methods is often used interchangeably such that PASK (phase- and amplitude-shift keyed) and APSK (amplitude- and phase- shift-keyed) terms are equivalent in that they both, as well as others (such as ASK-DPSK) represent a combination of PSK and ASK. The inclusion of (D) in the modulation scheme, such as DPSK, simply indicates the detection format, where D is used to denote differential detection (as opposed to coherent detection). The method described here is applicable to both differential or coherent detection formats.

The constellation diagrams illustrate the amplitude and phase of the data symbols with circular markers. Any given symbol can be an encoded set of one or more data bits. Furthermore, any specific amplitude-phase symbol can also exist in an orthogonal polarization, that means that two symbols can exist for each represented point on the constellation diagrams.

As illustrated in FIG. 9, a modulation scheme can be constructed to combine PSK and ASK in different ways, even for a given number of symbols (or modulation states). For example, four symbols are created in different methods in FIG. 9 (a) or (d) respectively; eight symbols are created with FIG. 9 (c), (e) and (f); 16 symbols can be created with FIG. 9 (g), (h), (i), and (j). Note method (h) uses two amplitudes in addition to the phase; method (i) uses three amplitudes in addition to the phase; method (j) uses four amplitudes in addition to the phase. Phase or amplitude adjustments can be made to enhance the performance of one symbol or combination of symbols thereby creating performance differences and enabling this invention. Also, the physical construction of these methods with available hardware devices will realize inate performance advantages in a specific portion of any given combined-modulation scheme.

Other possible forms of the method described above could use any bit errors (on any subset of the modulation scheme that is yet-to-be-occupied with traffic) to tune a dynamic PMD compensator, or any electronic compensator, or decision threshold to optimize performance (increase Q-factor and decrease BER).

Generally, a set of modulation symbols of a modulation scheme used for a given service level (or sub-signal) comprises at least two different modulation states or symbols. A set of modulation symbols for a first service level may thus comprise two or more modulation symbols of an example modulation scheme shown in FIG. 9 whereas a set of modulation symbols for a second or any further service level (or sub-signal) may comprise two or more different modulation symbols of the same (or another) example modulation scheme shown in FIG. 9.

Figure 10:
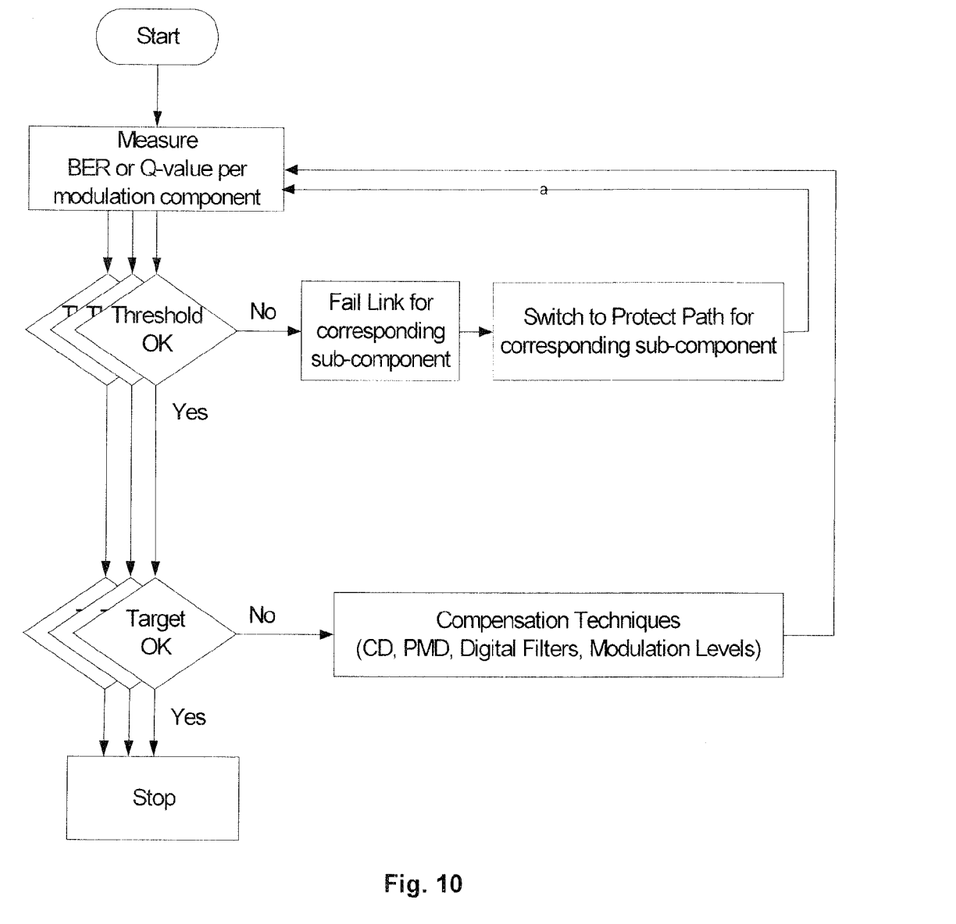

FIG. 10 shows a general flow-chart explaining the function performed for example by the control unit 21. Of course, the control unit 21 may be realized as a separate unit or integrated in the transmitting units 50 or in the receiving units 52. A distribute realization of the control unit 21 is also possible where parts of the functions may be performed in a separate control unit 21, the transmitting units 50 or the receiving units 52.

As can be seen from FIG. 10 the control unit 21 comprises the functionality of at first measuring the BER or Q-factor of the individual sub-signals. If a given threshold for the BER or Q-factor for the respective sub-signal (using the respective associated set of modulation symbols) is not "ok", i.e, the threshold for the BER is exceeded or the threshold for the Q-factor is under-run, the link is deemed to fail for the corresponding sub-signal and the sub-signal is switched to a protect path. If the threshold is "ok" it is examined in a further step whether or not a further target is met. This further target might be a (further) threshold for the BER (or Q-factor) which is lower (or higher) than the first threshold defining a desirable quality for the transmitted sub-signal. In case this further threshold is not met one or more compensation techniques may be applied like adjusting the modulation levels, receiving levels, filter parameters or CD or PMD compensation parameters such that the transmission quality for the corresponding sub-signal is improved. In both steps explained above the priority information for a service level may be used. If e.g. the threshold for a higher service level is not "ok" whereas the threshold for a lower service level is "ok" the control unit 21 may first use the adjustment technique(s) so as to meet the threshold (and even the further threshold). For this purpose the loops according to FIG. 10 may be run through one after the other, e.g. beginning with the loop for the sub-signal of the lowest service level.

Instead of measuring the BER or Q-factor for the single sub-signals it is also possible to measure the corresponding value for the aggregate signal, where in case that the threshold is not "ok" the sub-signal of the lowest service level is dropped and switched to a protect path.

Dropping the sub-signal from the optical digital signal that is transmitted over the optical link may already lead to an improvement of the BER or Q-factor of the remaining signal without additionally adjusting any parameter using the adjustment technique(s) (this is not necessarily the case). Furthermore, through applying one or more suitable adjustment techniques an (as the case may be additional) improvement may be reached.

The invention claimed is:

1. A data transmission method for transmitting a digital optical signal over an optical transmission link, the data transmission method comprising:
   a. creating a digital optical channel signal defining at least a first and a second service level, an aggregate information comprising information transported in the first service level and of information transported in the second service level being included in the digital optical channel signal via a modulation scheme comprising at least three modulation symbols, all of the modulation symbols differing in at least one modulation parameter,
   b. transmitting said digital optical channel signal at a near end over the transmission link,
   c. receiving said transmitted digital optical channel signal at a remote end of the transmission link by demodulating said received signal and extracting the information of the first and second service levels into a received signal,
   d. wherein, under normal operating conditions of the transmission link, one or more of the modulation parameters of the modulation scheme, receiving parameters of the transmission link, or transmission parameters of the transmission link are controlled such that the transmission performance with respect to the information transported in said first and second service level or the transmission performance with respect to the aggregate information transported in the digital optical channel signal reach predetermined quality levels,
   e. determining the transmission performance with respect to the information transported in said first and second service level or the transmission performance with respect to the aggregate information transported in the digital optical channel signal, and
   f. wherein in case that the relevant transmission performance is below a given threshold due to increased constraints of the transmission link at least one of the following actions is taken:
      i. The information transported in at least one service level is dropped from being included in the digital optical channel signal, the modulation scheme being designed such that dropping the at least one service level results in a reduction of the number of modulation symbols used for the digital optical channel signal transporting the information of the remaining service level or levels; or
      ii. one or more of the modulation parameters of the modulation scheme, receiving parameters of the transmission link, or transmission parameters of the transmission link are dynamically determined such that the transmission performance with respect to the information transported in one of said first and second service levels is increased to a predetermined quality level while decreasing the transmission performance of the respective other service level or levels.

2. A data transmission method according to claim 1, wherein a respective part of the modulation symbols of said modulation scheme is exclusively used for encoding the information transported in a respective service level.

3. A data transmission method according claim 1, wherein the modulation symbols are chosen such and wherein the digital optical channel signal is created such that the information included in the first service level is included in an amplitude shift keying modulation portion and that the information included in a second service level is included in a phase shift keying modulation portion.

4. A data transmission method according to claim 1, wherein said digital optical channel signal is created by combining a plurality of client signals which transport information that is fully included either within the first or within the second service level.

5. A data transmission method according to claim 1, wherein under normal operating conditions one or more of the modulation parameters of the modulation scheme, the receiving parameters of the transmission link, or the transmission parameters of the transmission link are controlled such that the transmission performance with respect to the information transported in said first service level is better than the transmission performance with respect to the information transported in said second service level.

6. A data transmission method according to claim 1, wherein in case one or more service levels are dropped, one or more of the modulation parameters of the modulation scheme, the receiving parameters of the transmission link, or the transmission parameters of the transmission link are controlled such that the transmission performance with respect to the information transported in said remaining service levels or the transmission performance with respect to the aggregate information transported in the digital optical channel signal reach predetermined quality levels.

7. A data transmission method according to claim 1, wherein the increased constraints of the transmission link are created due to a redirection of the transmission path of the transmission link or due to a quality decrease in the optical transmission properties of the transmission path.

8. A data transmission method according to claim 1, wherein said relevant transmission performance or said increased constraints of the transmission link are detected:
   a. by determining the bit error rate or the Q-factor of the signal received, or
   b. by determining one or more of the bit error rate or Q-factor of a first received sub-signal comprising the information included within the first service level or the bit error rate or Q-factor of a second received sub-signal comprising the information included within the second service level.

9. A data transmission network for transmitting a digital optical channel signal over an optical transmission link, the data transmission network comprising:
   a. a modulating and transmitting unit receiving at least one digital optical or electrical signal containing information to be transmitted over said transmission link,
      i. the modulating and transmitting unit creating a digital optical channel signal defining at least a first and a second service level, an aggregate information comprising the information transported in the first service level and the information transported in the second service level being included in the digital optical channel signal via a modulation scheme comprising at least three modulation symbols, all of the modulation symbols differing in at least one modulation parameter,
      ii. a transmitting port of the modulating and transmission unit being adapted to be coupled to a near end of the transmission link for transmitting said digital optical channel signal over said transmission link,
   b. a receiving unit for receiving said transmitted digital optical channel signal at a remote end of said transmission link by demodulating said received digital signal and extracting the information of the first and second service levels into a received signal,
   c. a control unit coupled to one or more of the modulating and transmitting unit, the receiving unit, or one or more units for influencing transmission parameters of the transmission link, the control unit for controlling the modulation parameters of one or more of the modulation schemes, the receiving parameters of the transmission link, or the transmission parameters of the transmission link, and for determining the transmission performance,
   d. wherein, under normal operating conditions of the transmission link, the control equipment controls modulation parameters of one or more of the modulation schemes, the receiving parameters of the transmission link, or the transmission parameters of the transmission link in a way that these parameters are controlled such that the transmission performance with respect to the information transported in said first or second service level or the transmission performance with respect to the aggregate information transported in the digital optical channel signal reach predetermined quality levels; and
   e. wherein in case that the relevant transmission performance is below a given threshold due to increased constraints of the transmission link, the control equipment performs at least one of the following actions:
      i. Controlling the modulating and transmitting unit such that the information transported in at least one service level is dropped from being included in the digital optical channel signal, the modulation scheme being designed such that dropping the at least one service level results in a reduction of the number of modulation symbols used for the digital optical channel signal transporting the information of the remaining service levels;
      ii. Controlling the modulation parameters of one or more of the modulation scheme, the receiving parameters of the transmission link, or the transmission parameters of the transmission link dynamically such that the transmission performance with respect to the information transported in one of said first and second service levels is increased to a predetermined quality level while decreasing the transmission performance of the respective other service level or levels.

10. A data transmission network according to claim 9, wherein said modulating and transmitting unit is adapted to receive at least one digital optical or electrical signal to be transmitted comprising at least two client signals, or wherein said modulating and transmitting unit directly receives two or more optical or electrical client signals to be transmitted, and wherein said modulating and transmitting unit is adapted to create the digital optical channel signal that is output at a transmitting port such that the respective information included in each of the at least two client signals is either fully included within the first or fully included within the second service level.

11. A data transmission network according to claim 9, wherein under normal operating conditions the control unit controls one or more of the modulation parameters of the first or second modulation schemes, the receiving parameters of the transmission line, or the transmission parameters of the transmission link such that the transmission performance with respect to the information transported in said first service level is better than the transmission performance with respect to the information transported in said second service level.

12. A data transmission network according to claim 11, wherein the second service level provides a lower level of service than the first service level and the control unit is adapted to control the modulating and transmitting unit such that, in case of increased constraints of the transmission link, the second service level is dropped.

13. A data transmission network according to claim 9, wherein in case one or more service levels are dropped, one or more of the modulation parameters of the modulation scheme, the receiving parameters of the transmission link, or the transmission parameters of the transmission link are controlled such that the transmission performance with respect to the information transported in said remaining service level or levels or the transmission performance with respect to the aggregate information transported in the digital optical channel signal reach predetermined quality levels.

14. A data transmission network according to claim 9, wherein the increased constraints of the transmission link are created due to one or more of a redirection of the transmission path of the transmission link, or a quality decrease in the optical transmission properties of the transmission path.

15. A data transmission network according to claim 9, wherein said receiving unit is adapted to detect said increased constraints of the transmission link or determines said relevant transmission performance
   a. by measuring the bit error rate or the Q-factor of the received signal, or b. by one or both measuring the bit error rate or Q-factor of a first received sub-signal comprising the information included within the first service level, or determining the bit error rate or Q-factor of a second received sub-signal comprising the information included within the second service level.

16. A data transmission network according to claim 9, wherein the modulating and transmitting unit is adapted to use a respective part of the modulation symbols of said modulation scheme exclusively used for encoding the information transported in a respective service level.

17. A data transmission network according to claim 9, wherein the modulating and transmitting unit is adapted to use modulation symbols which allow for creating the digital optical channel signal such that the information included in the first service level is included in an amplitude shift keying modulation portion and that the information included in a second service level is included in a phase shift keying modulation portion.

* * * * *